United States Patent [19]
Philipp

[11] Patent Number: 5,467,638
[45] Date of Patent: Nov. 21, 1995

[54] METHOD AND DEVICE FOR RECOGNIZING THE KNOCKING OF AN INTERNAL-COMBUSTION ENGINE

[75] Inventor: Matthias Philipp, Stuttgart, Germany

[73] Assignee: Robert Bosch GmbH, Stuttgart, Germany

[21] Appl. No.: 284,528

[22] PCT Filed: Mar. 20, 1993

[86] PCT No.: PCT/DE93/00254

§ 371 Date: Aug. 4, 1994

§ 102(e) Date: Aug. 4, 1994

[87] PCT Pub. No.: WO93/20424

PCT Pub. Date: Oct. 14, 1993

[30] Foreign Application Priority Data

Apr. 7, 1992 [DE] Germany .......................... 42 11 645.7

[51] Int. Cl.[6] .................................................. G01L 23/22
[52] U.S. Cl. .................................................. 73/35.06
[58] Field of Search .......................... 73/35; 364/431.08; 123/425, 435

[56] References Cited

U.S. PATENT DOCUMENTS

| | | | |
|---|---|---|---|
| 4,356,551 | 10/1982 | Iwase | 364/431.08 |
| 4,512,310 | 4/1985 | Haraguchi | 73/35 |
| 5,321,973 | 6/1994 | Sogawa | 73/35 |
| 5,347,846 | 9/1994 | Kitano | 73/35 |

*Primary Examiner*—Hezron E. Williams
*Assistant Examiner*—Christine K. Oda
*Attorney, Agent, or Firm*—Michael J. Striker

[57] ABSTRACT

The method of detecting knocking of an internal combustion engine includes generating a sensor signal with a knock sensor provided with the internal combustion engine; digitizing the knock sensor signal to form a digitized signal; high-pass filtering the resulting digitized signal to form a high-frequency signal; counting amplitudes of oscillations the high-frequency signal which are greater than a first threshold value (P1) to form an amplitude count; integrating an absolute value of the high-frequency signal to obtain an integrated signal; comparing the integrated signal to a second threshold value (P2); and generating an output signal indicating that knocking is occurring when the amplitude count is at least one and when the integrated signal is greater than the second threshold value (P2).

10 Claims, 3 Drawing Sheets

METHOD AND DEVICE FOR RECOGNIZING THE KNOCKING OF AN INTERNAL-COMBUSTION ENGINE

BACKGROUND OF THE INVENTION

The invention relates to a method for recognizing the knocking of an internal-combustion engine and to a device for carrying out the method.

It is known that so-called knocking can occur under specific operating conditions of an internal-combustion engine. By this is meant shock waves of a fuel/air mixture which become noticeable as, inter alia, audio-frequency vibrations of the engine. Since the knocking is accompanied, as a rule, by a high thermal load on the piston-cylinder wall located on the combustion-space side, during which erosions of material can occur, the aim is fundamentally to prevent knocking, since, if it occurs for a relatively long period of time, it can lead to a destruction of the internal-combustion engine.

However, since, on the other hand, the aim is to utilize as far as possible the existing working range of the internal-combustion engine, particularly with regard to engines for racing cars, there is a need to recognize the knocking of the internal-combustion engine as early and as reliably as possible. At the same time, there is the measurement problem of reading out the knock signal reliably and in a fault-free manner from the vibrations of the internal-combustion engine recorded by a sensor, so that the internal-combustion engine can be regulated appropriately as a function of the occurrence of the knocking.

It is generally known that, to recognize knocking, a signal assigned to the knocking process is compared with a reference signal. If the reference signal is exceeded by the knock signal, a knock-recognition signal is transmitted. A disadvantage of this is that the reference signal has to be provided in a highly complicated manner.

SUMMARY OF THE INVENTION

It is an object of the present invention to provide a method of detecting knocking of an internal combustion engine which does not have the above-described disadvantages.

According to the invention, the method of detecting knocking of an internal combustion engine includes the steps of:

a) generating a sensor signal characteristic of knocking with a knock sensor provided with the internal combustion engine;

b) digitizing the sensor signal generated in step a) to form a digitized signal;

c) high-pass filtering the digitized signal formed in step b) to form a high-frequency signal including oscillations having amplitudes;

d) counting the amplitudes of the oscillations of the high-frequency signal greater than a first threshold value (P1) to form an amplitude count;

e) integrating an absolute value of the high-frequency signal to obtain an integrated signal;

f) comparing the integrated signal to a second threshold value (P2); and g) generating an output signal indicating that knocking is occurring, when the amplitude count is at least one and when the integrated signal is greater than the second threshold value (P2).

In contrast to this, the advantage of the method according to the invention, having the features mentioned above claim, is that the input signal obtained, supplied by a knock sensor, can be fed directly to a knock control known per se and is balanced there with specific actual values of the internal-combustion engine. For this purpose, the signals from the knock sensor are digitized, subsequently high-pass-filtered and then integrated on, and the signal thus obtained is compared with two predetermined limit values, a knocking process being recognized when both limit values are exceeded.

This soon shows that the knock signal to be evaluated can be differentiated from other subsidiary signals with the highest reliability.

In an advantageous embodiment of the invention, provision is made for taking the pressure trend of the cylinder internal pressure of an internal-combustion engine as a basis for generating the signals of the knock sensor, and for comparing this signal with an absolute value, predetermined as a desired value, of the energy content of the pressure vibrations and the number of pressure amplitudes above a pressure limit value.

In an especially advantageous way, the comparative measurement is carried out within a measurement window dependent on the position of the crankshaft.

According to the invention, the device for detecting knocking in an internal combustion engine comprises a knock sensor, advantageously a pressure transducer, for generating a sensor signal characteristic of knocking in the internal combustion engine; an analog/digital converter connected to the knock sensor to receive the sensor signal and to generate a digitized signal; and processor means for high-pass filtration and analysis of the sensor signal to detect the presence of a knocking condition in said internal combustion engine. The processor means includes high-pass filter means for high-pass filtration of the digitized signal to form a high-frequency signal, means for counting amplitudes of oscillations of the high-frequency signal greater than a first threshold value (P1) to form an amplitude count; means for integrating an absolute value of the high-frequency signal to obtain an integrated signal; means for comparing the integrated signal to a second threshold value (P2); and means for generating an output signal indicating knocking is occurring when the amplitude count is at least one and the integrated signal is greater than the second threshold value.

The advantage of the device according to the invention is that, in a simple way, few components known per se are connected together to form a knock-recognition circuit which guarantees a reliable differentiation of the knock signals from further signals and which, when knock signals are recognized, allows a regulation of the combustion-influencing variables, for example the ignition timing, as a function of the actual position of the positions of the crankshaft and camshaft which are essential for the combustion process.

BRIEF DESCRIPTION OF THE INVENTION

The objects, features and advantages of the present invention will now be illustrated in more detail by the following detailed description, reference being made to the accompanying drawing in which:

FIG. 1 is a block diagram of an apparatus according to the invention for detecting knocking of an internal-combustion engine, FIG. 2 is a graphical illustration of a pressure signal from the knock sensor including high-frequency, FIG. 3 shows the high-pass-filtered signal derived from the pressure signal of FIG. 2, and FIG. 4 shows the high-pass-filtered and integrated knock signal derived from the signal of FIG. 3.

FIG. 5 shows a block diagram for a processor means for performing the method according to the invention.

DESCRIPTION OF PREFERRED EMBODIMENTS

Figure 1:
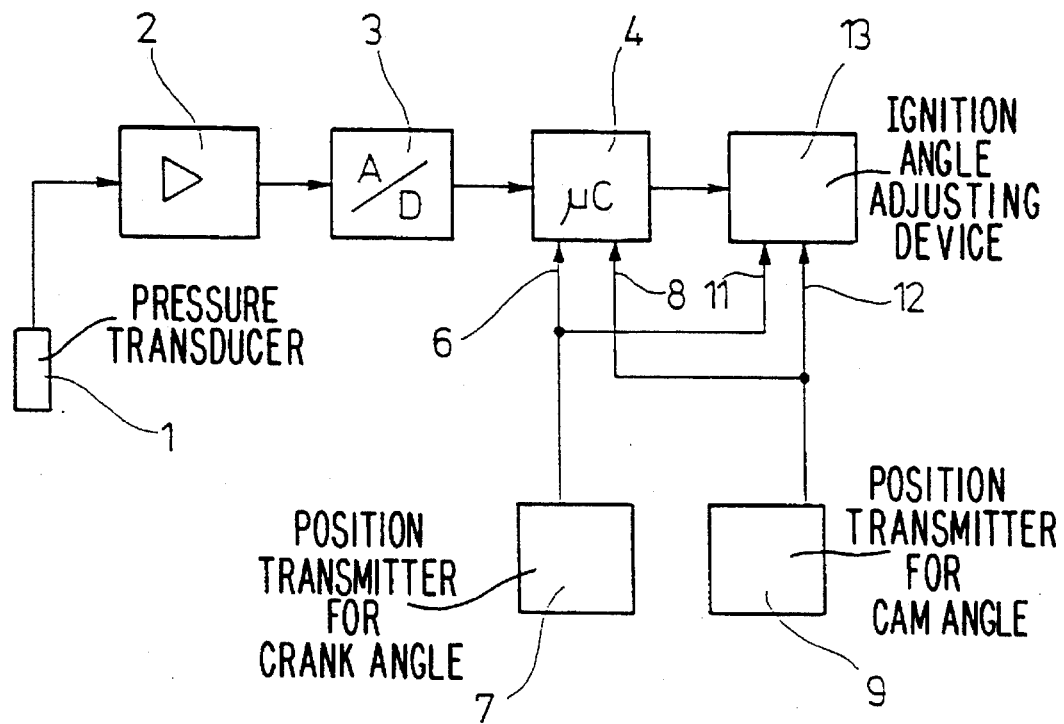

In the exemplary embodiment illustrated in FIG. 1, a knock sensor 1, designed as a pressure transducer for the combustion pressure in the cylinder inner space, is connected via a charge amplifier 2 to an analog/digital converter 3. The analog/digital converter 3 is connected to a signal processor 4. The signal processor 4 possesses, furthermore, an input 6, which is connected to a position transmitter 7 for the crank angle, and an input 8, which is connected to a position transmitter 9 for the cam angle. The output of the signal processor 4 is connected to an ignition-angle adjusting and regulating device 13 for the knock control. The ignition-angle adjusting and regulating device 13 is connected via an input 11 to the position transmitter 7 for the crank angle and via an input 12 to the position transmitter for the cam angle.

The mode of operation of the device illustrated in FIG. 1 is as follows and is explained in conjunction with the curve trends represented in FIGS. 2 to 4.

Figure 2:
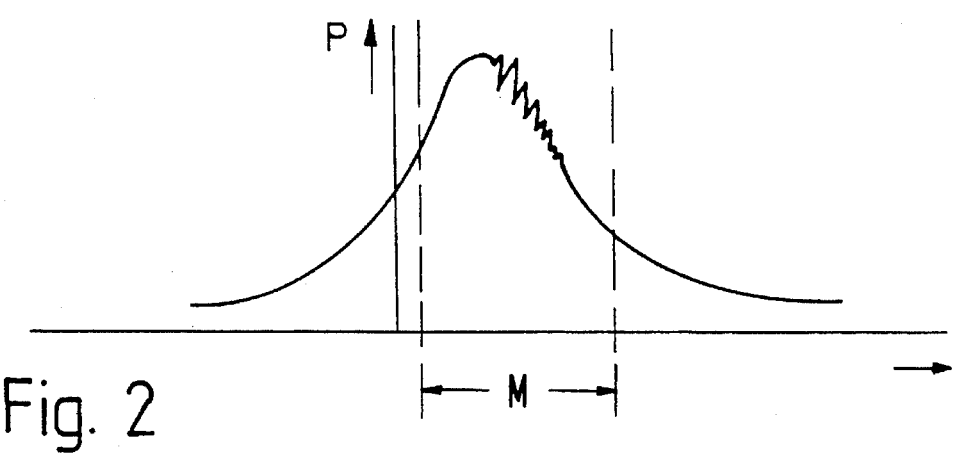

The knocking combustion of an internal-combustion engine has a highly typical trend, as represented by way of example in FIG. 2.

The signal trend represented in FIG. 2, which is obtained by the pressure transducer 1 designed as pressure sensor for the combustion pressure in the cylinder inner space, has, in the falling part of the curve, vibrations which possibly imply a knocking combustion.

In order to simplify the evaluation, unimportant information is preferably tuned out by forming a measurement window M. An evaluation of the signal trend takes place only during this measurement window M. The measurement window M is preferably formed as a result of the attainment of a specific crankshaft angle. This purpose is served by the information of the position transmitter for the crank angle, the information being applied via the input 6. This makes use of the fact that knocking combustion can occur only in a specific angular sector of a crankshaft revolution. Knocking combustion is not possible outside this angular sector, because, for example in a four-stroke internal-combustion engine, inlet or outlet valves are opened. The signals obtained via the pressure sensor 1 are fed to the charge amplifier 2 and are amplified there.

The amplified signal is digitized via the analog/digital converter 3 and is fed to the signal processor 4.

Figure 3:
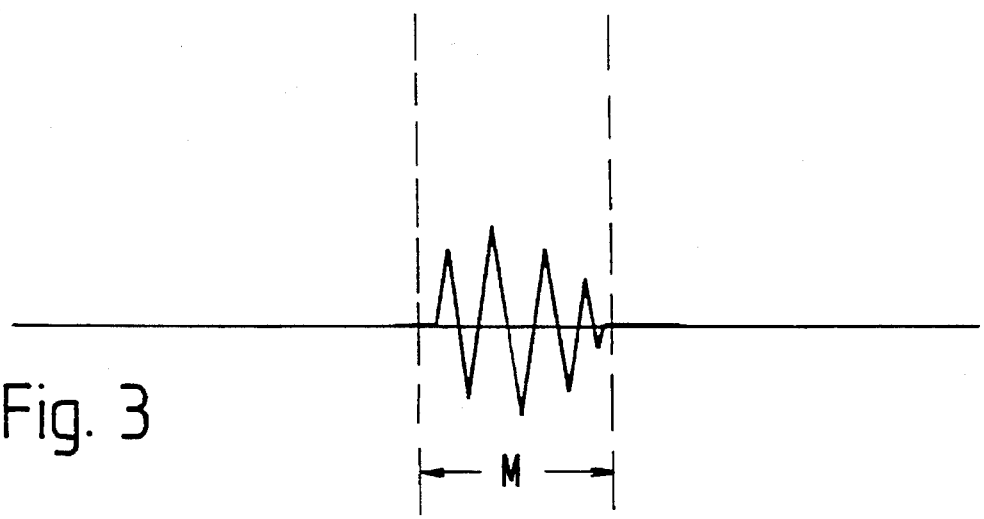
Figure 4:
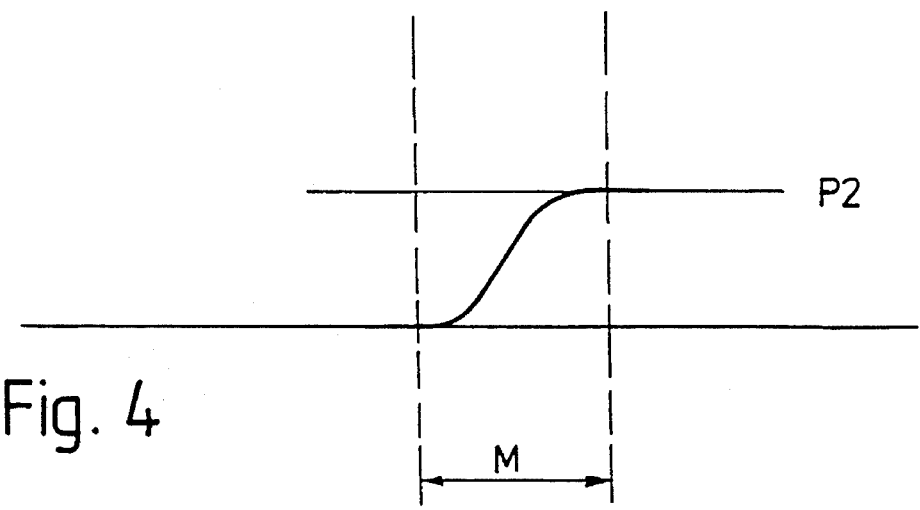
Figure 5:
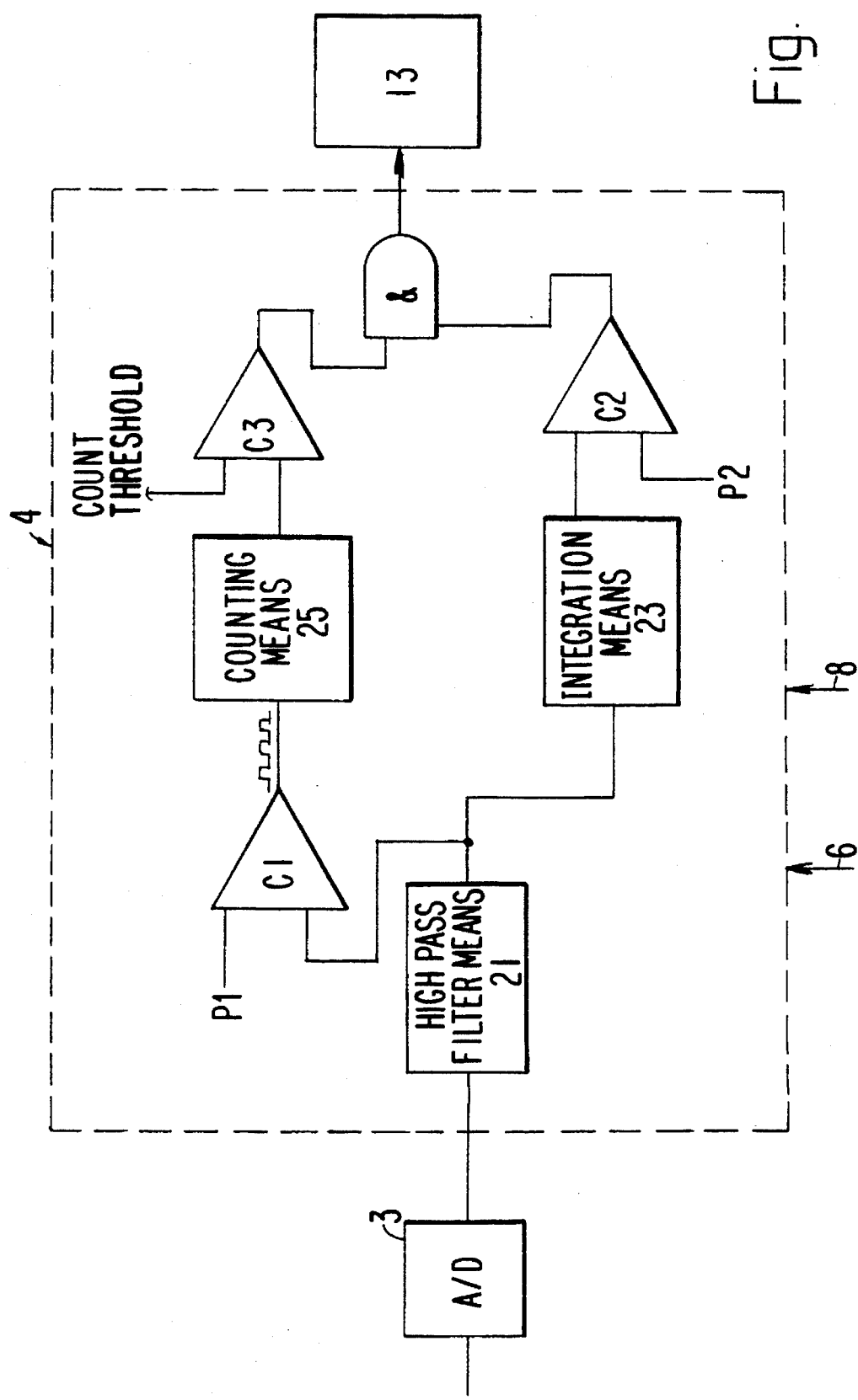

A high-pass filtration of the signal by a high-pass filter means 21 in processor 4 (FIG. 5) produces a signal trend, as represented by way of example in FIG. 3. Since the knocking vibrations are typically of very high frequency, other noises are filtered out and, with the highest possible reliability, only the signals actually of interest are evaluated.

These vibrations are thereupon analyzed to ascertain whether they are attributable to knocking combustion. For this purpose, in a simple form, first the pressure amplitudes located within the measurement window M and above a specific pressure threshold P1 as determined in comparison means C1 are counted in counting means 25.

Furthermore, the high-pass-filtered pressure signals are integrated integrating means 23 as absolute values. As a result, the energy content of the high-frequency pressure vibrations, the so-called pressure integral, is obtained. The typical trend of a pressure integral is shown in FIG. 4.

The energy content of the pressure vibrations is compared with a limit value P2 in comparison means C2 known for knocking combustion in internal-combustion engines.

An evaluation now takes place in the signal processor 4 to the effect that, when the energy content of the pressure vibrations exceeds the limit value P2 and simultaneously the number of pressure amplitudes located above the pressure threshold P1 exceeds a predetermined number or count threshold in comparison means C3, knocking combustion is recognized by combining output signals from the comparison means C2 and C3 in and gate &.

As a result of the simultaneous recording and evaluation of two signal values which are different, but which are essential for knocking combustion in internal-combustion engines, knocking combustion is recognized with high reliability at the correct moment.

In the event that knocking combustion is occurring, this information is fed to an ignition-angle adjusting and regulating device 13, known per se, for a knock control which itself influences the possible and intended knock-reducing parameters in a way not described in any more detail here.

I claim:

1. Method of detecting knocking of an internal combustion engine, said method comprising the steps of:

a) generating a sensor signal characteristic of said knocking by a knock sensor provided with said internal combustion engine;

b) digitizing said sensor signal generated in step a) to form a digitized signal;

c) high-pass filtering said digitized signal formed in step b) to form a high frequency signal comprising a plurality of oscillations having amplitudes;

d) counting said amplitudes of said oscillations of said high frequency signal greater than a first threshold value (P1) to form an amplitude count;

e) integrating an absolute value of said high-frequency signal to obtain an integrated signal;

f) comparing said integrated signal to a second threshold value (P2); and g) generating an output signal indicating said knocking is occurring, when said amplitude count is at least one and when said integrated signal is greater than said second threshold value (P2).

2. Method as defined in claim 1, wherein said internal combustion engine is provided with at least one cylinder having an internal pressure and said sensor signal of said knock sensor is proportional to the internal pressure in the at least one cylinder of the internal combustion engine and said first threshold value is a pressure value.

3. Method as defined in claim 2, wherein said second threshold value is an absolute value characteristic of an energy content of said high frequency signal.

4. Method as defined in claim 3, wherein said comparing is performed only during a measurement window defining an operating phase of said internal combustion engine.

5. Method as defined in claim 4, wherein said internal combustion engine has a crankshaft and said measurement window is open when said crankshaft is at a crank angle in a crank angle range of said crankshaft and closed when said crank angle is outside said crank angle range.

6. Method as defined in claim 4, wherein said internal combustion engine has a camshaft and said measurement window is open when said camshaft is at a cam angle in a cam angle range of said camshaft and closed when said cam angle is outside said cam angle range.

7. Device for detecting knocking in an internal combustion engine, said device comprising a knock sensor for generating a sensor signal characteristic of said knocking in said internal combustion engine;

an analog/digital converter connected to said knock sensor to receive said sensor signal and to generate a digitized signal;

processor means for high pass filtration and analysis of said sensor signal to detect a presence of a knocking condition in said internal combustion engine, wherein said processor means includes high-pass filter means for high-pass filtration of said digitized signal to form a high frequency signal comprising a plurality of oscillations having amplitudes, means for counting said amplitudes of said oscillations of said high frequency signal greater than a first threshold value (P1) to form an amplitude count; means for integrating an absolute value of said high-frequency signal to obtain an integrated signal; means for comparing said integrated signal to a second threshold value (P2); and means for generating an output signal indicating said knocking is occurring when said amplitude count is at least one and said integrated signal is greater than said second threshold value.

8. Device as defined in claim 7, wherein said knock sensor is a pressure transducer.

9. Device as defined in claim 7, wherein said internal combustion engine includes a crankshaft and further comprising a position transmitter connected to said crankshaft, said position transmitter including means for generating a crankshaft position signal including information regarding an angular position of said crankshaft.

10. Device as defined in claim 7, wherein said internal combustion engine includes a camshaft and further comprising a position transmitter connected to said camshaft, said position transmitter including means for generating a camshaft position signal including information regarding an angular position of said camshaft.

* * * * *